Patented Dec. 9, 1930

1,784,165

UNITED STATES PATENT OFFICE

YOSHIO TANAKA, OF KITATOSHIMA-GUN, TOKYO-FU, AND TSUTOMU KUWATA, OF EBARA-GUN, TOKYO-FU, JAPAN

METHOD OF PRODUCING BORNEOL AND LIMONENE

No Drawing. Application filed July 8, 1929, Serial No. 376,848, and in Japan March 18, 1929.

This invention relates to a method of treating pinene or pinene-containing material, such as turpentine oil, with organic acids in presence of silica gel and has for its object to provide a method of producing borneol and limonene from pinene or pinene-containing material in good yields.

Borneol is artificially obtained by the reduction of d- and l-camphor by means of sodium, or by the saponification of bornyl esters obtained by the direct action of various organic acids on pinene. In the latter process, several methods have been proposed. The Ampère Electro-Chemical Co., has proposed a method in which pinene or turpentine oil is treated at 120–130° C. with anhydrous oxalic acid and the resulting product is saponified with lime and distilled with steam. It was also proposed by V. Isajew that borneol ester may be obtained by heating a mixture of pinene and organic acids with fuller's earth or so-called Floridin or metallic chlorides at high temperatures (100–180° C.). These methods have, however, the disadvantages that the quality of borneol is exceedingly inferior and its yield is not sufficient to ensure the commercial succcess. These disadvantages are clearly due to the abundant production of polymerized products in the above methods and this polymerization appears to be due to high reaction temperature, but lower temperature prolongs considerably the reaction.

The present invention consists in treating pinene or pinene-containing material with organic acids, such as oxalic, benzoic, phthalic acids, etc., in presence of silica gel at lower temperatures. The catalytic action of silica gel in the reaction between pinene and organic acids, is very strong and consequently the reaction proceeds very smoothly and rapidly in lower temperatures than those in the process hitherto known. In the present invention, it has been found that the proper temperature is 50–100° C. Due to the low temperature, the formation of the polymerization products is reduced to minimum, and moreover it was also discovered that the liquid part of the reaction products contained a remarkable amount of limonene. Borneol is easily obtained from borneol ester by saponification. Hence the present invention provides a method of direct production of borneol and limonene from pinene without producing any waste products.

The following example is given to explain the present invention:—

One hundred kgs. of anhydrous pinene are mixed with 10–20 kgs. of silica gel and about 20–25 kgs. of dry oxalic acid. The mixture is warmed to 50–100° C. under constant agitation. Oxalic acid may be added little by little. The oily part is distilled out from the reaction products by blowing in steam, leaving the solid ester which is saponified with caustic alkali and distilled with steam to obtain borneol. The borneol is further purified by recrystallizing from gasoline or other suitable solvents, or by sublimation.

The oily part, consisting of limonene and unchanged pinene, is fractionaly distilled to separate limonene and pinene, the latter being used repeatedly.

By the method of the present invention, 40–50% of borneol and 30–40% of limonene may easily be obtained from pinene.

In the present invention, Japanese acid clay which was previously treated with hydrochloric acid to remove aluminium and other metallic compounds may be used as catalyst, instead of silica gel.

Having now particularly described and ascertained the nature of the said invention, and in what manner the same is to be performed, we claim:—

1. A method of producing borneol and limonene consisting in treating pinene or pinene-containing material with organic acids in presence of silica gel as catalyst, and distilling out the limonene and saponifying the remaining borneol ester.

2. A method of producing borneol and limonene consisting in treating pinene or pinene-containing material at 50–100° C. with oxalic acid in presence of silica gel as catalyst, distilling out the limonene, and saponifying the remaining borneol oxalate.

In testimony whereof we affix our signatures.

YOSHIO TANAKA.
TSUTOMU KUWATA.